(12) United States Patent
Kargman

(10) Patent No.: US 6,801,228 B2
(45) Date of Patent: Oct. 5, 2004

(54) METHOD AND USER INTERFACE FOR SPECIFYING TOPPINGS AND THEIR PLACEMENT ON A PIZZA

(75) Inventor: James B. Kargman, Chicago, IL (US)

(73) Assignee: IPDEV Co., Chicago, IL (US)

(*) Notice: Subject to any disclaimer, the term of this patent is extended or adjusted under 35 U.S.C. 154(b) by 492 days.

(21) Appl. No.: 09/949,389

(22) Filed: Sep. 7, 2001

(65) Prior Publication Data

US 2002/0077912 A1 Jun. 20, 2002

Related U.S. Application Data

(60) Provisional application No. 60/230,680, filed on Sep. 7, 2000.

(51) Int. Cl.[7] .................................................. G09G 5/00
(52) U.S. Cl. ........................ 345/837; 345/810; 345/835; 345/840; 705/26
(58) Field of Search ................................. 345/810–847, 345/700, 962, 976, 977; 705/26, 15, 25, 27, 1

(56) References Cited

U.S. PATENT DOCUMENTS

| | | | | |
|---|---|---|---|---|
| 5,687,331 A | * | 11/1997 | Volk et al. ................. 345/840 |
| 5,832,446 A | * | 11/1998 | Neuhaus ........................ 705/1 |
| 6,002,395 A | * | 12/1999 | Wagner et al. .............. 345/763 |
| 6,087,927 A | * | 7/2000 | Battistini et al. ....... 340/286.09 |
| 6,553,386 B1 | * | 4/2003 | Alabaster ................. 707/104.1 |
| 6,585,516 B1 | * | 7/2003 | Alabaster ..................... 434/127 |
| 2002/0055878 A1 | * | 5/2002 | Burton et al. ................. 705/26 |
| 2003/0046700 A1 | * | 3/2003 | Wilcox et al. ................ 725/60 |

* cited by examiner

Primary Examiner—Sy D. Luu
(74) Attorney, Agent, or Firm—Greenberg Traurig, LLP

(57) ABSTRACT

A method and user interface for designating toppings to be assembled on a pizza as well as their respective position on the pizza is disclosed. The user interface presents a plurality of three part buttons associated with the available topping with the three parts of each button corresponding to the left half, right half and entire surface of the pizza. The method includes the steps of pressing part of a button to select the topping and the quantity to be applied to the left half, right half, or entire surface of the pizza and highlighting a portion of the button to indicate which portion of the pizza was designated to receive the topping and in what quantity.

12 Claims, 2 Drawing Sheets

METHOD AND USER INTERFACE FOR SPECIFYING TOPPINGS AND THEIR PLACEMENT ON A PIZZA

This application claims the benefit of 60/230,680 filed on Sep. 7, 2000.

BACKGROUND OF THE INVENTION

1. Field of the Invention

The present invention relates to a method and user interface for designating the ingredients or toppings to be assembled on a pizza as well as their position on the pizza. It is contemplated that the present invention could be incorporated into a point of sale order screen such as may be utilized in a computerized point of sale order taking system.

2. Background Art

A pizza parlor operating a carry-out and/or delivery business typically maintains a phone bank staffed by order takers who answer incoming telephone calls from customers who are calling to place an order for pizzas or other food items to be picked-up by the customer or delivered to the customer's location. The order takers receive the caller's order which is ultimately relayed to the kitchen to be filled. In some instances, the order takers merely note the customer's order on a printed order form by handwriting the particular order or by checking off boxes on the preprinted form to designate the food items being ordered. In some cases, order takers may have access to a computer based point-of-sale order system where, using a visual display and/or user input device, such as a keyboard or touch-screen, order takers are able to enter into a computer system both the customer's identifying information, such as a name, address and/or telephone number, as well as the food items being ordered. Such computerized systems operate according to software programming which executes the order entry process and controls the screen display, automatically calculates the total charge for the order and transmits the order automatically to the kitchen for preparation.

In a typical restaurant serving pizza, the customer is provided with the opportunity to select from a list ingredients which particular toppings the customer wants placed on the pizza. Customers are further provided the opportunity to specify that certain toppings be placed on one-half of the pizza and other toppings be placed on the other half. Moreover, customers are typically offered the opportunity to designate not only the particular toppings, but also the quantity of toppings, usually as a multiple of the standard measure, e.g. such as by ordering a pizza with double pepperoni.

Customers have become quite creative when it comes to configuring pizza orders. Pizza toppings are no longer limited to the basic ingredients and increasingly include more and more ingredients and toppings, some unconventional, if not exotic. A given customer may place a relatively complex order in an attempt to meet the demands of all of the members of a family who are sharing the pizza. The typical prior art order entry system, be it paper or computerized, still presents a significant opportunity for error in the order taking process—errors which are typically not discovered until a customer receives delivery or returns home with a carry-out order. Errors in the order taking process can cost a restaurant both money and good will in having to replace incorrect orders and/or provide credits to be used on future purchases.

The present invention provides a unique and useful method and user interface for use in conjunction with a computerized point of sale system which facilitates the taking of custom orders from customers specifically designating ingredients or toppings for the left side, right side or entire pizza all in a intuitive and graphic fashion.

The present invention further serves to permit the order taker to not only easily enter an order but to also easily verify the correctness of the order by viewing in color a display of the pizza toppings chosen, confirming the customer's order and minimizing error.

These and other desirable characteristics of the present invention will become apparent in view of the present specification and drawings.

SUMMARY OF THE INVENTION

A method is disclosed for designating toppings to be assembled on a pizza as well as their respective position on the pizza utilizing a user interface having a plurality of three part "buttons" where each button is associated with a specific topping which the customer may choose to have applied to a pizza. The three parts of each button correspond to the left half, right half and entire surface of the pizza respectively. The method of one embodiment of the present invention comprises the steps of: selecting one part of one of the three part buttons to designate the application of the topping associated with the button pressed to the left half, right half, or entire surface of the pizza; highlighting at least a portion of the left half, right half or entirety of the button pressed to indicate that the left half, right half or entire surface of the pizza is to receive the topping associated with the button pressed; and repeating the foregoing steps for each topping to be designated for application to the pizza.

The step of selecting a part of one of the three part buttons may be performed by touching the button, where the buttons are displayed on an electronic touch screen video display. Alternatively the step of selecting one part of one of the three part buttons may be performed by pressing one or more keys on a computer keyboard that are associated with the button part being selected, in lieu of the use of a touch screen based system.

The user may press one or more keys on a computer keyboard by simultaneously pressing a first key and a second key, where the first key is associated with a particular topping and the second key is associated with the portion of the pizza (left, right or all) to which the topping should be applied. In a further embodiment, the buttons may be comprised of regions on an electronic video display, and the step of selecting one part of one of the three part buttons may comprised of the substeps of positioning a cursor on the video display over the button part to be selected using an electronic pointing device; and performing a clicking operation with the electronic pointing device.

A further embodiment of the present invention comprises the steps of: selecting a first part of one of the three part buttons to designate the application of the topping associated with the button pressed to the portion of the pizza surface corresponding to the first part; highlighting a first portion of the left half, right half or entirety of the button pressed to indicate that the left half, right half or entire surface of the pizza is to receive the topping associated with the button pressed; selecting the first part of one of the three part buttons a second time to designate that a double portion of the topping is to be applied to the portion of the pizza surface corresponding to the first part; highlighting a second portion of the left half, right half or entirety of the button pressed to indicate that the left half, right half or entire surface of the pizza is to receive a double portion of the topping designated; and repeating the foregoing steps for each topping to be designated for application to the pizza.

The present invention also comprises a graphic user interface apparatus for facilitating the designation of toppings to be assembled on a pizza as well as their respective positions on the pizza. The user interface comprises a plurality of buttons each corresponding to a specific topping which may be designated for application to a pizza. Each button has a left, center and right region corresponding respectively to the left half, entire surface and right half of the pizza. Means, such as software operating on the computerized point of sale system control the display screen and highlight at least a portion of the left half, right half or entirety of each button when the left, right or center region of a button is selected; whereby the topping associated with each button is to be applied to the portion of the pizza corresponding to the highlighted regions. The graphic user interface may further provide for highlighting a first portion of the left half, right half or entirety of each button when a left, right or center region of the button is selected a first time; and highlighting a second portion of the left half, right half or entirety of each button when the left, right or center region of the button is selected a second time; whereby the topping associated with each button is to be applied to the portion of the pizza corresponding to the highlighted regions in a quantity corresponding to the number of highlighted portions of each region.

DETAILED DESCRIPTION OF THE DRAWINGS

Figure 1:
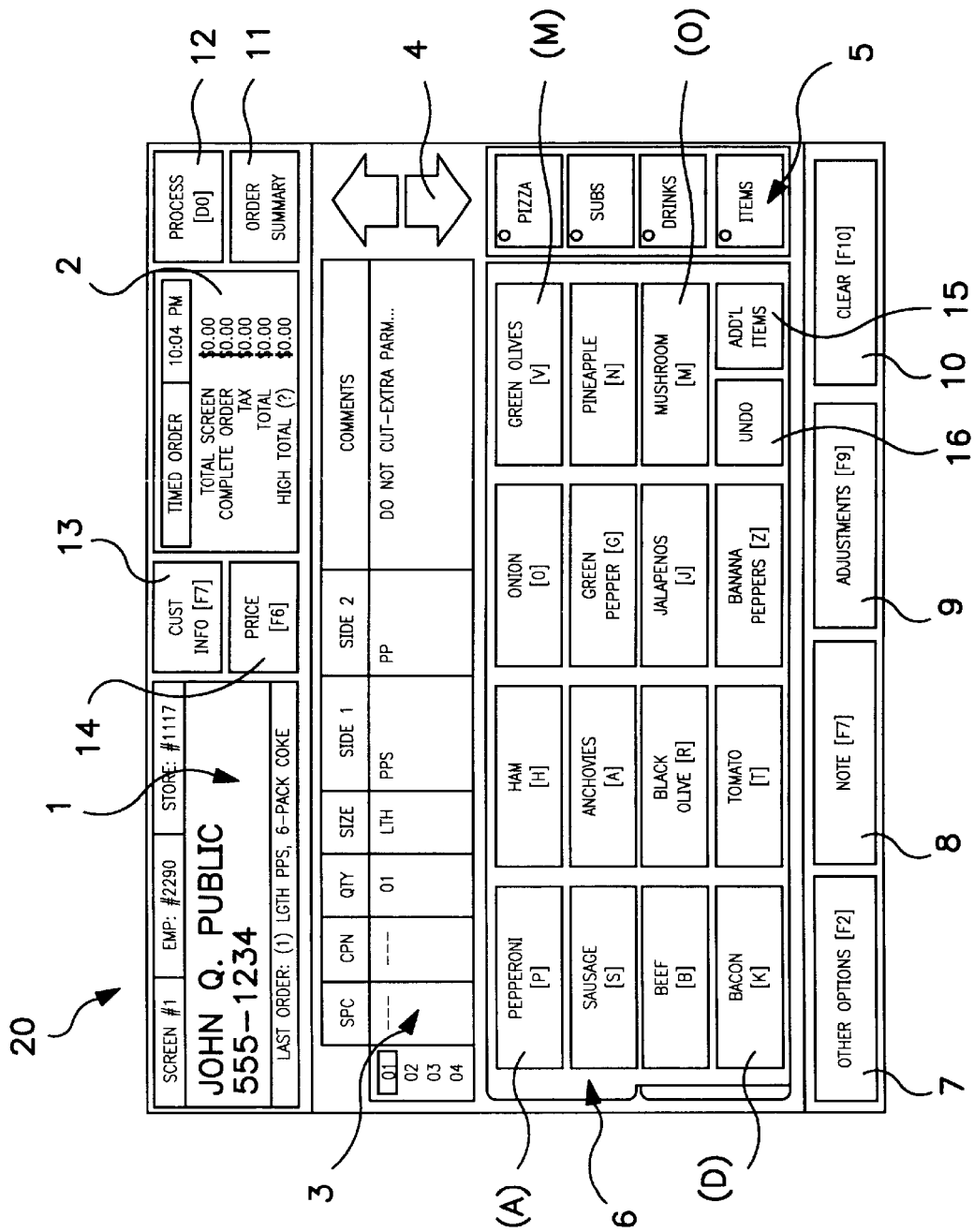
FIG. 1 of the drawings illustrates the use of a multicolor graphical user interface according to the present invention for specifying ingredient selection and placement on a pizza, and FIG. 2 of the drawings illustrates detailed examples of the visual appearances of a single topping "button" as displayed according to the present invention.

While this invention is susceptible to embodiment in many different forms, there are shown in the drawings and will be described in detail herein specific embodiments. The present disclosure is to be considered as an exemplification of the principle of the invention intended merely to explain and illustrate the invention, and is not intended to limit the invention in any way to embodiments illustrated.

FIG. 1 of the drawings illustrates one embodiment of the present invention and specifically illustrates a multicolor graphical user interface according to the present invention for use in specifying ingredient selection and placement on a pizza. The graphical user interface 20 pictured in FIG. 1 is contemplated as being presented to a system user or order taker on a CRT or touch-screen terminal. The graphical user interface 20 includes and presents to the user a plurality of "buttons" which the user may press by either positioning a cursor over the button using a mouse and clicking, by physically contacting the screen proximate the button in the case of a touch-screen display, or by using the keyboard and pressing the key associated with a particular button. The generation of the display is under the control and operation of the computerized point of sale system running software programming which can be readily created by one of ordinary skill in the art having the present disclosure before them.

The displayed screen, which is identified as "screen No. 1" in the upper left corner, illustrates several fields, each conveying information relevant to the business and/or individual transaction being conducted. Specifically, region 1 identifies the name and telephone number of the customer calling the restaurant. Within this region, the employee number of the user operating the terminal, as well as the restaurant's store number are identified together with a synopsis of the last order placed by this customer. Region 2 of the screen conveys to the user parameters relative to the current order including the time of day and the total amount due from the customer based upon the order for food items being placed.

Region 3 specifies in text format the particular food items which the user has entered into the system corresponding to food items being ordered by the customer. In the present illustration, a single item is pictured as having been ordered and as identified by the indication "01" in the left most column of region 3 and identifies that a single item under the column heading quantity (QTY) has been ordered and identifies that the item is a large sized pizza as indicated by the abbreviations LTH.

Columns labeled "side 1" and "side 2" serve to provide a textual indication to the user that side 1 of the pizza is to contain a double pepperoni topping (as represented by two "P's") and a single sausage topping (as represented by a single "S") and that side 2 is to contain only a double pepperoni topping (as represented by two "P's"). The "comments" field in the embodiment illustrated informs the kitchen that the pizza is not to be cut and further that extra parmesan cheese is to be added. If additional food items were ordered they would appear in region 3, one after the other in rows "02", "03" and so forth. The arrows shown in region 4 permit scrolling this display up and down to permit the user to view and, if necessary, edit line items corresponding to the food items ordered.

In this particular screen, the pizza button has been selected, indicated by its being highlighted or changing to a different color. By selecting the "pizza" button the ingredient menu for pizzas is displayed in region 6. Customer orders for other food items may be entered selecting one of the remaining buttons associated with "subs", "drinks" or other "items" displayed in region 5. Access to additional system options, entry of notes or adjustments may be obtained by pressing buttons 7 through 9, respectively. The order screen can be cleared by actuating button 10. An order summary may be obtained with button 11 and the order can be designated as accepted for processing by pressing button 12. Additional price information and customer information can also be obtained using buttons 13 and 14.

The graphics displayed in region 6 illustrate a novel aspect of the present invention which provides a user interface and implements a novel method for designating the toppings and ingredients to be applied to a pizza in a graphical manner facilitating the order entry verification in a very intuitive and insightful manner.

The illustrated embodiment of the invention provides for selection of fifteen possible toppings using buttons designated A through O. Additional toppings may be selected and their choices presented upon pressing button 15 which will cause further ingredient buttons to be displayed, taking the place of buttons A–O. The most recent action taken by the order taker can be erased by pressing "undo" button 16 without clearing the customer's entire order.

Each button A through O appearing on the user interface comprises a combined input means and display element.

In the example illustrated, the user interface display indicates that a single pizza has been ordered, that a double application of pepperoni topping is to be applied to both the left and right side of the pizza and that a single application of sausage topping is to be applied to only the left side of the pizza. The user selects these ingredients for the pizza and views the resulting selection all through the unique graphical user interface presented by the present invention as follows.

To select a topping for the pizza the user merely presses a topping button A–O. Each topping button A through O is divided into three (3) regions, left, center and right which correspond to the left side, all, and right side of the pizza, respectively. By pressing the left region of a button, the ingredient corresponding to that button is selected for application to only the left side of the pizza. If the right region of the button is pressed, that ingredient is selected for application to only the right side of the pizza. If the center region of the button is pressed, that ingredient is selected for application to the entire pizza.

In this manner, the user may accurately input a customer's highly customized order with minimal chance of error by merely pressing the buttons on the touch-screen and designating the whole pizza, or one or the other half of the pizza for receipt of a given topping in a highly intuitive manner.

The button effects described herein can be achieved and implemented by either changes of color or highlighting both of which serve to graphically convey to the user the state of customer's specific order.

Figure 2:
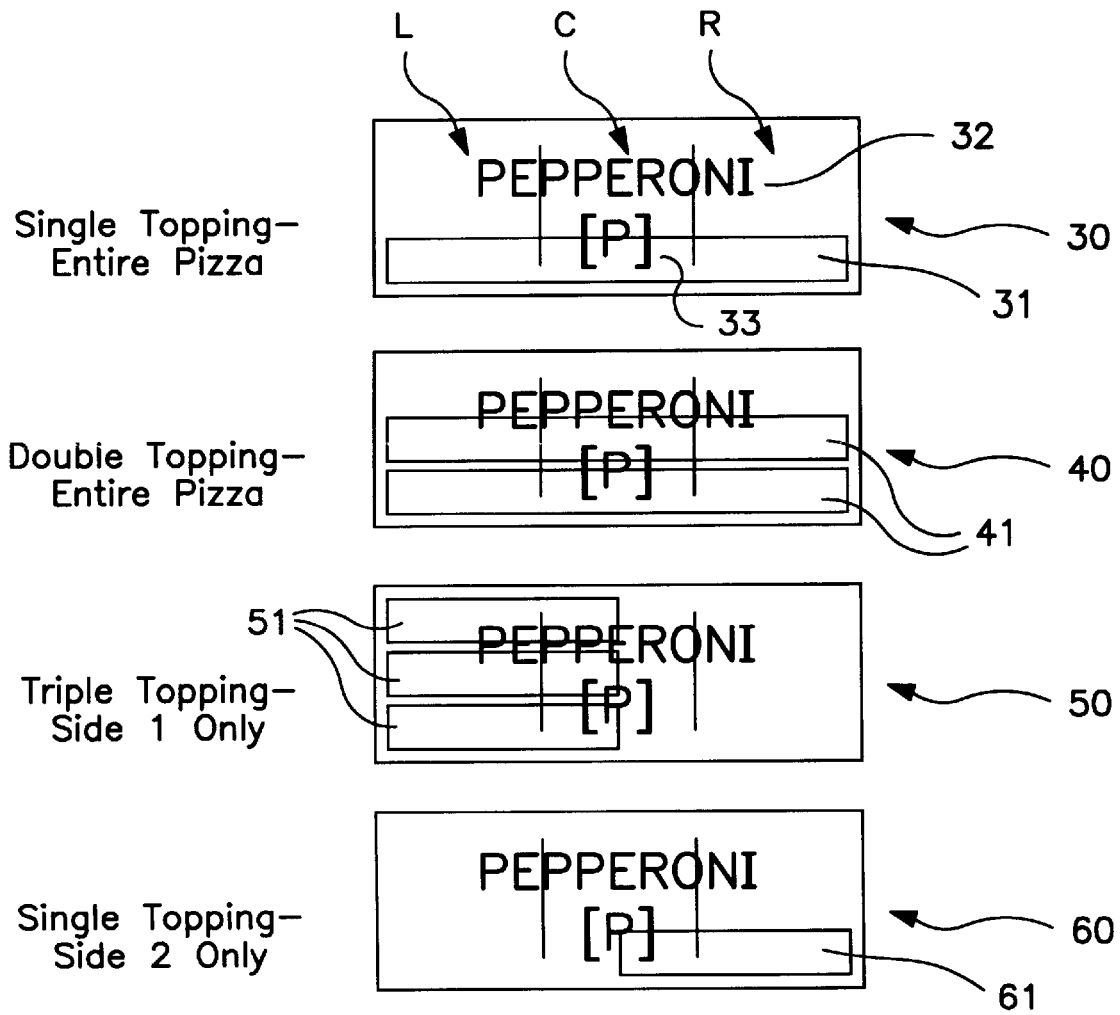

FIG. 2 of the drawings illustrates various detailed examples of the visual appearances of an exemplar topping "button" as displayed in region 6 according to the present invention. The uppermost button 30 illustrated in FIG. 2 corresponds to button A of FIG. 1. However, in the illustrated embodiment, the single colored or highlighted bar 31 of button 30 indicates that a single topping of pepperoni has been designated for application across the entire pizza. Button 30 includes the textual display 32 indicating to the user that this button is applicable to the topping "pepperoni". The abbreviation "P" appearing in brackets, designated by numeral 33, conveys to the user the shorthand or abbreviation for this button which appears in the textual display of region 3. To select a pepperoni topping for application across the entire pizza the user would merely depress the center region C of button 30 a single time.

Button 40 illustrates that a double topping of pepperoni has been designated for application across the entire pizza. To make this selection the user merely depresses the center region of the button, designation C, two times to signify that a double topping is to be applied across the entire pizza. The double colored or highlighted bars 41 extending across the entire button indicate to the user that a double application of the particular topping has been selected. Button 50 illustrates that a triple application of pepperoni has been designated for application to only the left side of the pizza. This is graphically displayed by showing not one, not two, but rather three colored bars or regions 51 appearing on the left side of the display of button 50. To make such a designation, the user merely presses the left region of button 50, designated "L", three times.

If the user makes a mistake in designating the quantity of toppings, such as by pressing the any region of a button one or more times too many, the user may simply keep pressing the button and the system will "roll" through the possible designations for that ingredient by showing single, double or triple or no toppings corresponding to that button as being selected.

Button 60 likewise illustrates another example wherein a single order for the ingredient pepperoni has been designated for application to the right side of the pizza only as indicated by the single colored or highlighted bar 61 extending across only the right side of the button. This is likewise accomplished by merely depressing the right region "R" of button 60 a single time.

While most prior art systems that are computer based provide the user with the ability to designate ingredients being applied to only half of the pizza, they do so by providing a "one-half key" or a "left" or "right" key to allow the user to designate which half of the pizza is to receive a topping. However, the present invention is markedly distinct from the foregoing prior examples by providing three separate touch areas on a single on-screen "button" designated left, center and right or alternatively, left, all and right.

Accordingly, if the user touched the center or "all" region of a button, the corresponding ingredient is designated as being applied to the entire pizza and one "bar" across the entire key illuminates or becomes highlighted with a distinct color. If the user touches only the left side of the button, then that particular ingredient is designated as being applied only to the left side of the pizza and one bar across only the left half of the key appears. Conversely, if the user presses the right side of the button, then the ingredient is designated as being applied to only the right side of the pizza and a single bar on only the right half of the button appears. To designate "extra toppings", the user merely touches the button region again and two bars of intensity would be displayed to designate that a double topping has been selected and if touched again, three bars would be displayed to designate that a triple topping has been selected.

Accordingly, the present invention replaces prior art systems which require that multiple keys be pressed and provides a single unitary display that readily and rapidly communicates to the user in a very clear fashion the particular ingredients or toppings to be applied to the pizza.

In the foregoing examples, it has been contemplated that the present invention be implemented in a computerized system having a touch-screen display element whereby the user merely presses a finger or pencil or other implement upon the surface of the screen proximate and overlying a particular button and region thereof to provide a user input to the system and to thereby actuate that button.

Alternatively, the display could be actuated by user input provided through the use of a conventional keyboard where, for example the designation of pepperoni would be made by pressing the key corresponding to the abbreviation appearing below the text indication of pepperoni, e.g. the letter P, sausage the letter S, beef the letter B, etc. By holding down or pressing the key P with another predetermined key, the combined input could be taken to indicate that pepperoni is to be applied to one-half, the other half or all of the pizza, depending upon which additional key is pressed. For example, holding down the letters P and L together on a keyboard could designate that pepperoni is to be applied to the left half of the pizza, and pressing them a second time would indicate double topping on the left half of the pizza. Pressing the letter P together with the letter A could be taken by the system to be designated as applying pepperoni to the entirety of the pizza and so on.

When one of the aforementioned regions within a button is selected or "pressed" via either direct physical contact or keyboard actuation, the visual appearance of the particular button is changed by the addition of graphic highlighting. Accordingly, by merely looking at the graphical user interface, and in particular the topping buttons displayed in region 6, the user can readily and visually observe that the pizza being ordered is to have a double topping of pepperoni across both the left and right side and that only a single application of sausage is being applied to the left side. This is in marked contrast to the textual display shown in region 3, and employed by the prior art. Accordingly, the order taker communicating with the customer is provided with a graphical system which is readily available, discernable, is not subject to misinterpretation, permits the rapid review of the order with the customer and minimizes error in the order taking process.

The present invention could of course be implemented with a conventional display where user inputs are provided to the system by actuation of a conventional keyboard in combination with a pointing device such as a computer mouse. In such an implementation, buttons such as those of region 6 could be activated through the positioning of the mouse pointer in conjunction with clicking on the left, center, or right portions of a button display.

In another alternative embodiment, the present invention could be implemented in a conventional mechanical or membrane keyboard input device having back-lit keys which are depressed by the user to designate the ingredients or toppings and their placement on a pizza. Depending upon which portion of which key is pressed a corresponding back-light would illuminate to simulate the information provided by the on-screen graphic user interface described above.

While the present invention is disclosed herein for use in connection with a computerized point of sale system, this method and user interface may also be used in connection with Internet based food ordering systems accessed by consumers via the Internet to configure and place their own food orders. Using Java script or enhanced html or active-X programming buttons can be provided to the user which function in the same fashion as they do on a point of sale system.

The foregoing description and drawings merely explain and illustrate the invention and the invention is not limited thereto, as those skilled in the art who have the disclosure before them will be able to make modifications and variations therein without departing from the scope of the invention.

What is claimed is:

1. A method for designating toppings to be assembled on a pizza as well as their respective position on the pizza utilizing a user interface having a plurality of three part buttons where each button is associated with a specific topping which may be applied to a pizza and the three parts of each button correspond to the left half, right half and entire surface of the pizza respectively, the method comprising the steps of:

selecting one part of one of the three part buttons to designate the application of the topping associated with the button pressed to the left half, right half, or entire surface of the pizza;

highlighting at least a portion of the left half, right half or entirety of the button pressed to indicate that the left half, right half or entire surface of the pizza is to receive the topping associated with the button pressed;

repeating the foregoing steps for each topping to be designated for application to the pizza.

2. The method of claim 1, in which the step of selecting one part of one of the three part buttons is performed by touching the button.

3. The method of claim 1, in which the buttons are comprised of regions on an electronic video display, and the step of selecting one part of one of the three part buttons is performed by pressing one or more keys on a computer keyboard that are associated with the button part being selected.

4. The method of claim 3, in which the step of pressing one or more keys on a computer keyboard is performed by simultaneously pressing a first key and a second key, where the first key is associated with a particular topping and the second key is associated with the portion of the pizza to which the topping should be applied.

5. The method of claim 1, in which the buttons are comprised of regions on an electronic video display, and the step of selecting one part of one of the three part buttons is comprised of the substeps of positioning a cursor on the video display over the button part to be selected using an electronic pointing device; and performing a clicking operation with the electronic pointing device.

6. A method for designating toppings to be assembled on a pizza as well as their respective position on the pizza utilizing a user interface having a plurality of three part buttons where each button corresponds to a specific topping which may be applied to a pizza and the three parts of each button correspond to the left half, right half and entire surface of the pizza respectively, the method comprising the steps of:

selecting a first part of one of the three part buttons to designate the application of the topping associated with the button pressed to the portion of the pizza surface corresponding to the first part;

highlighting a first portion of the left half, right half or entirety of the button pressed to indicate that the left half, right half or entire surface of the pizza is to receive the topping associated with the button pressed;

selecting the first part of one of the three part buttons a second time to designate that a double portion of the topping is to be applied to the portion of the pizza surface corresponding to the first part;

highlighting a second portion of the left half, right half or entirety of the button pressed to indicate that the left half, right half or entire surface of the pizza is to receive a double portion of the topping designated; and repeating the foregoing steps for each topping to be designated for application to the pizza.

7. The method of claim 6, in which the step of selecting a first part of one of the three part buttons is performed by touching the button.

8. The method of claim 6, in which the buttons are comprised of regions on an electronic video display, and the step of selecting a first part of one of the three part buttons is performed by pressing one or more keys on a computer keyboard that are associated with the button part being selected.

9. The method of claim 8, in which the step of pressing one or more keys on a computer keyboard is performed by simultaneously pressing a first key and a second key, where the first key is associated with a particular topping and the second key is associated with the portion of the pizza to which the topping should be applied.

10. The method of claim 6, in which the buttons are comprised of regions on an electronic video display, and the step of selecting one part of one of the three part buttons is comprised of the substeps of positioning a cursor on the video display over the button part to be selected using an electronic pointing device; and performing a clicking operation with the electronic pointing device.

11. A graphic user interface apparatus for facilitating the designation of toppings to be assembled on a pizza as well as their respective positions on the pizza, the user interface comprising:

a plurality of buttons each corresponding to a specific topping which may be designated for application to a pizza, each button having a left, center and right region corresponding respectively to the left half, entire surface and right half of the pizza;

means for highlighting at least a portion of the left half, right half or entirety of each button when the left, right or center region of a button is selected;

whereby the topping associated with each button is to be applied to the portion of the pizza corresponding to the highlighted regions.

12. A graphic user interface apparatus for facilitating the designation of toppings to be assembled on a pizza, as well as their respective quantities and positions on the pizza, the user interface comprising:

a plurality of buttons each corresponding to a specific topping which may be designated for application to a pizza, each button having a left, center and right region corresponding respectively to the left half, entire surface and right half of the pizza;

means for highlighting a first portion of the left half, right half or entirety of each button when a left, right or center region of the button is selected a first time;

means for highlighting a second portion of the left half, right half or entirety of each button when the left, right or center region of the button is selected a second time;

whereby the topping associated with each button is to be applied to the portion of the pizza corresponding to the highlighted regions in a quantity corresponding to the number of highlighted portions of each region.

* * * * *